United States Patent [19]
Akins

[11] 3,736,067
[45] May 29, 1973

[54] REBORING TOOL FOR BRAKE SPIDERS

[76] Inventor: Lee R. Akins, 1384 N. 33rd St., Springfield, Oreg.

[22] Filed: Dec. 15, 1971

[21] Appl. No.: 208,481

[52] U.S. Cl. ..................408/79, 408/137, 408/236
[51] Int. Cl. ..............................................B23b 45/14
[58] Field of Search..........................408/79, 72, 236, 408/234, 137, 138, 115, 14

[56] References Cited

UNITED STATES PATENTS 3,131,583    5/1964   Hanley et al. ..........................408/97

*Primary Examiner*—Gil Weidenfeld
*Attorney*—James D. Givnan, Jr.

[57] ABSTRACT

A boring tool for repairing brake spiders in place on a vehicle axle. The tool having a base rotatably mountable on the axle spindle with adapter means permitting tool use on various spindle configurations. Elongate bearing sleeves radially spaced from the base are adapted for rotation into axial alignment with the anchor pin bores of the brake spider. A retention bar and a boring bar interchangeably journalled in said sleeves respectively position the tool. Rotation of the base subsequent to a first boring operation permits bar extraction and interchange prior to a second boring operation. Additional structure is shown providing feed means for the boring bar. A modified form of the invention permits permanent retention of retention and boring bars within their respective sleeves.

9 Claims, 8 Drawing Figures

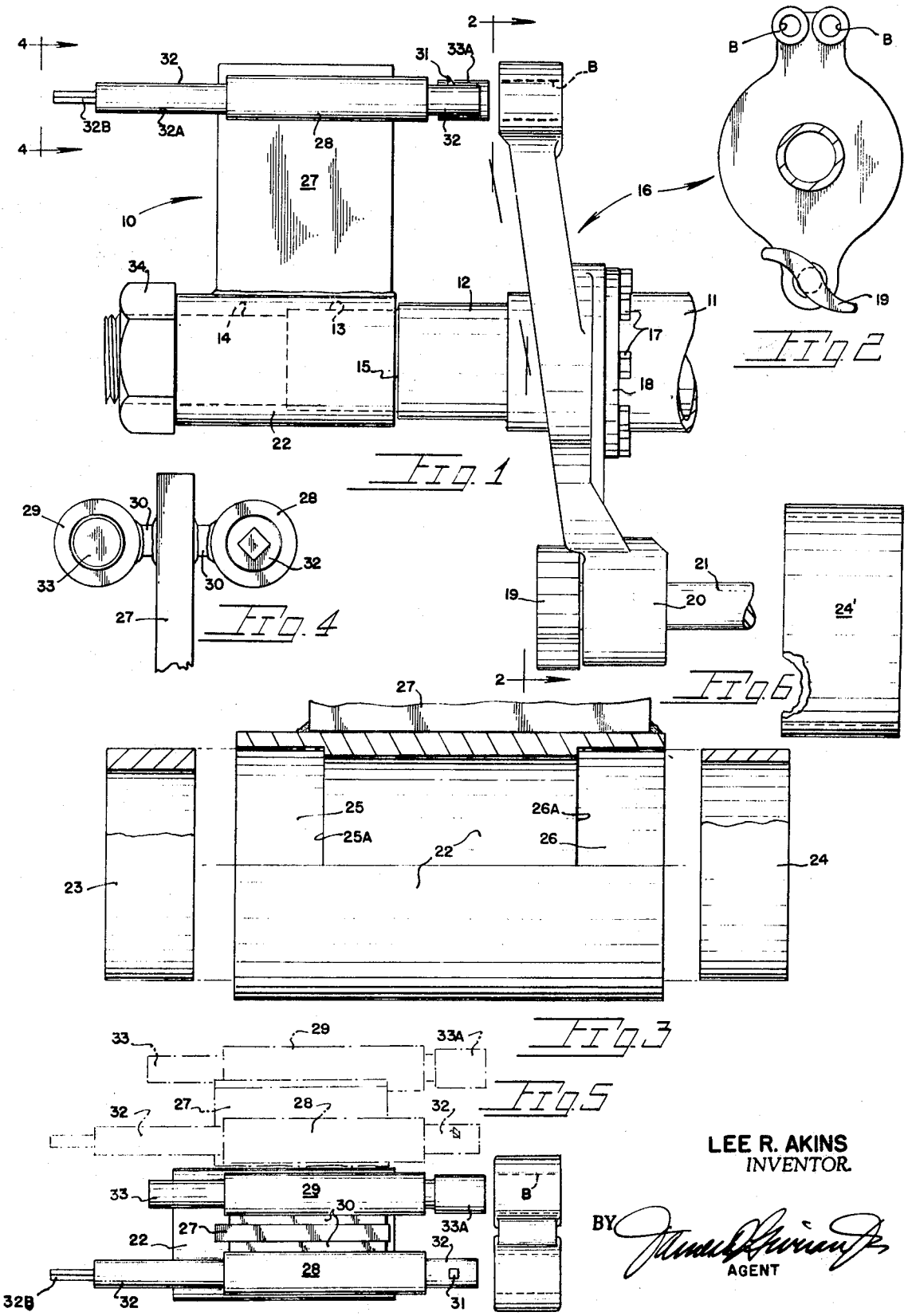
PATENTED MAY 29 1973　　3,736,067
SHEET 1 OF 2
LEE R. AKINS
INVENTOR.
BY 
AGENT

LEE R. AKINS
INVENTOR.

BY *James R. [signature]*
AGENT

REBORING TOOL FOR BRAKE SPIDERS

BACKGROUND OF THE INVENTION

The present invention relates to a tool for use in the servicing of the spider component of a vehicle brake mechanism. The tool, among other advantages, permits the spider to remain in place on the truck or trailer axle while anchor pin openings in the spider are enlarged to receive bushings.

The brake spider serves to pivotally mount the anchored ends of a pair of brake shoes by means of anchor pins passing through the shoe ends and the spider. The upper end of the axle mounted spider defines a pair of bores within each of which is secured an anchor pin. During braking, the brake shoes are retained against rotational movement with the brake drum by said anchor pins. In the overhaul of large truck and trailer brake mechanisms it is often necessary to rebore the anchor pin bores of the spider as the substantial reaction loads borne thereby will have caused the bores to become out of round by reason of radially directed metal migration.

It is a common practice to remove the brake spider component for reboring either at the brake repair station or at a machine shop all of which entails considerable costly manhour effort and down time of the truck or trailer. Brake spiders may either be welded or bolted to the vehicle axle which complicates their removal for repair purposes. While efforts have been made towards providing reboring equipment for servicing axle mounted brake spiders the practice of removing brake spiders is still commonly followed for one reason or another. A reboring fixture directed toward the present purposes is shown in a U. S. patent issued to W. G. Hanley et al., U.S. Pat. No. 3,131,583. The fixture shown therein differs considerably in that, for example, in use it is mounted to the brake spider and requires removal of the S-cam from the spider.

SUMMARY OF THE INVENTION

The instant invention concerns a tool for use in the reboring of brake spiders, particularly the anchor pin bores therein without removal of the spider from the vehicle axle. The tool includes a base engageable with the outer end segment of an axle being worked on with said base being adaptable to various axle diameters to permit use of a single tool for the repair of spiders on the several different makes of large truck and trailer axles. The ends of the base are adapted to retain inserts of different inside diameters corresponding to the outside diameter or diameters of the axle. Commonly, the outer end segments or spindles of an axle will have reduced diameters about which closely fit the above mentioned inserts. Accordingly, the base is mounted for arcuate swinging movement about the axle as later described.

Affixed to the base is a support member which mounts plural bearing sleeves in axial alignment with the anchor pin bores. Said sleeves serve to receive both a boring tool and a retainer bar the latter for precise positioning and retention of the tool during a reboring operation. Each sleeve is of elongate configuration to provide a suitable bearing surface for boring tool operation without additional bearing surfaces being required for boring tool support. Similarly above mentioned the upright support comprises rigid plate structure secured to the base and securing the bearing sleeves against deflection during a boring operation. Reboring is accurately done with the axle itself serving as a holder for the base of the tool and about which the base is manually swung to the position desired.

In one form of the invention the boring bar and retainer bar are used in an interchangeable manner with boring of the anchor pin bores being done successively with the boring and retainer bars being interchanged between boring operations. Another form of the invention comprehends a pair of boring bars and a retainer bar all used in a non-interchangeable manner. Still another modification provides manual feed means for a boring bar all of which are adapted to be powered by an electric drill.

An important feature of the present invention is the provision of a fixture which is readily adaptable for reboring brake spiders on various axles the sizes and configurations of which will vary with different axle models and manufacturers and whether or not it is a truck or trailer axle. Adapter means are attachable to the interior of the base to effect base-axle concentricity to allow the axle to be utilized as a support on which the tool is swingably mounted. The mounting of the tool base on the axle housing entails only the selection and fitting of adapters within the tool base prior to placement on the axle. The base may be conveniently retained in place by the re-applied spindle nut.

From the foregoing it will be evident that the fixture is of simplified construction permitting a fixture of low manufacturing cost and hence practical for any size of repair establishment. Of equal importance is the fact that the fixture lends itself to being readily set up for a boring operation with no tedious adjustment of various elements being necessary hence the job of reboring brake spiders is quickly accomplished in an accurate, time saving manner. For repairing one specific make and model of axle the adapters may, of course, be permanently affixed to the base. The present tool does not require removal of the S-cam shaft from the spider.

A further object of the present invention is the provision of bearing sleeve components and support structure of the fixture which permits precise boring of the anchor pin bore. Loads imparted to the fixture during enlargement of the bore are effectively transferred jointly to the tool base and the spider with no discernible displacement of the bearing sleeves.

A modified form of the invention further expedites the spider reboring operation by including a pair of boring bars, each spaced laterally from a central retainer bar. In this form of the invention, the boring bars are not required to be interchangeable with the single retainer bar but rather are fully operable while remaining journalled in their respective bearing sleeves.

A still further object of the present fixture is the provision of feed means for the boring bar said means comprising a threaded member for uniform advancement of the bar into the anchor pin bore. While shown and described in association with one form of the invention this feed arrangement is compatible with the remaining form with but slight alteration.

BRIEF DESCRIPTION OF THE DRAWINGS

In the accompanying drawings:

FIG. 1 is a side elevational view of one form of the reboring fixture in place on an axle spindle with the boring and retainer bars shown spaced from anchor pin bores of a brake spider, FIG. 2 is an elevational view taken along line 2—2 of FIG. 1 and showing a typical spider of a conventional brake mechanism, FIG. 3 is an enlarged side elevational view of the fixture base of FIG. 1 shown with a quadrant removed and with adapter rings removed therefrom, FIG. 4 is an end view of the upper portion of the fixture taken along line 4—4 of FIG. 1, FIG. 5 is a plan view of the fixture shown in FIG. 1 with a broken line position indicating a position permitting interchanging of said boring and retainer bars, FIG. 6 is a side elevational view of another annular insert for the tool base.

DESCRIPTION OF PREFERRED EMBODIMENTS

Figure 7:
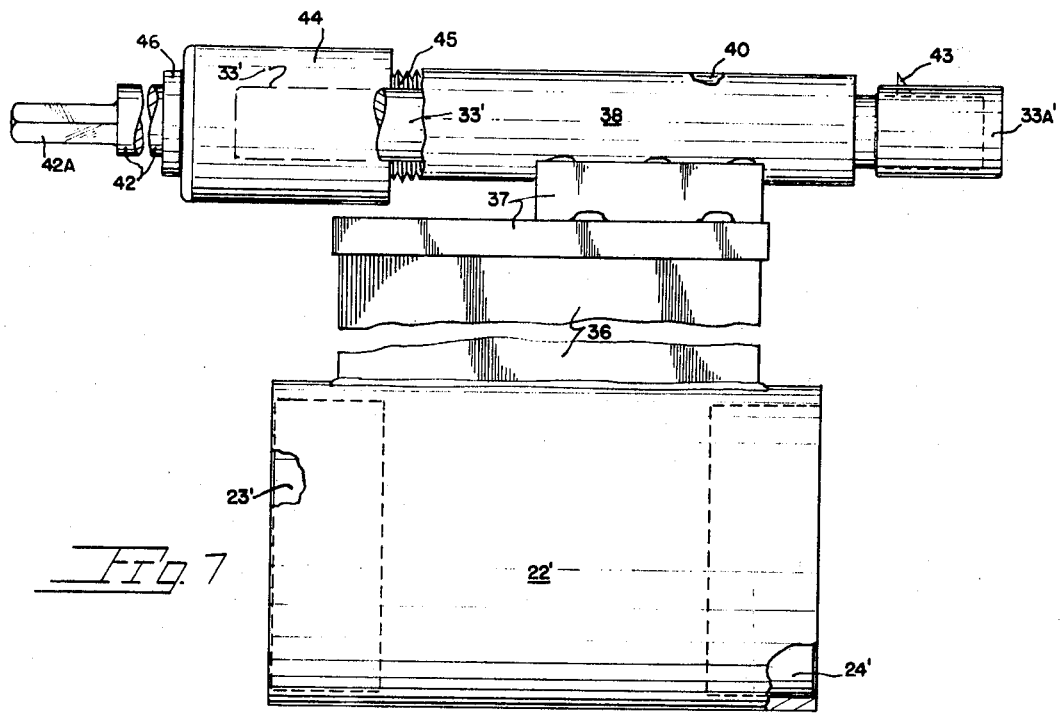
FIG. 7 is a side elevational view of a modified form of the fixture shown sectioned for convenience of illustration.

With continuing reference to the drawings wherein applied reference numerals indicate parts similarly identified in the following specification, the reference numeral 10 indicates generally the present tool in supported placement upon the outer end segment of a vehicle axle at 11.

The present tool is adapted for coaxial placement onto the axle end or spindle subsequent to removal of the vehicle wheel, hub and associated wheel bearings. The outer ends of axles are characteristically defined by a spindle portion or portions as at 12, 13 and 14 of reduced diameters and of varying lengths. The tool base as later described is positionable upon said reduced axle portions 12–14 and preferably against a shoulder 15 defining said diameters. The considerable operational travel of the later described boring and retainer bars renders the exact positioning of the base along the spindle of no critical importance with only adequate clearance being necessarily maintained for clearance of the bars during lateral movement thereof per FIG. 5.

Indicated generally at 16 is a brake spider of conventional configuration, securely affixed to the axle 11 by a ring of bolts 17 passing through an axle flange 18. With joint reference to FIG. 2 it will be seen that the brake spider defines, at its upper end, a pair of anchor pin bores B which normally receive anchor pins swingably mounting the upper ends of the brake shoes which are not shown. The lower portion of the brake spider defines a boss 20 within which is journalled the outer end of an S-cam shaft 21 having a brake actuating cam 19 thereon none of which need be disturbed for use of the present tool.

A base at 22 of the present tool is best shown in FIG. 3 wherein a quadrant has been broken away to disclose internal structure. The base is of open construction to receive the axle end with adapter means effecting desired seating of the base thereon. The adapter means shown is in the form of annular means 23–24 which may be termed inserts. A quantity of additional inserts, having unlike inner diameters, are provided for use in conjunction with the base 22 for the obvious purpose of adapting same to different axle diameters as are found on various makes of truck and trailer axles. While the inserts shown are of uniform length other inserts may additionally vary in length as seen at 24' in FIG. 6 for the purpose of achieving desired axial positioning of the base along the outer axle segment, such positioning being for the purpose of spacing the bearing sleeves outwardly a desired distance from the upper end of the spider. The base 22 is shown as having counter bored insert receiving areas 25–26 terminating inwardly in internal shoulders 25A–26A. While not shown it is entirely feasible that the base 22 may be supported by other adapter means interposed between the base and axle.

Secured to the outer wall of the base is an upright support 27 with a weld along its lower terminus providing secure attachment to said base. The support extends upwardly a suitable distance to oppositely receive a pair of bearing sleeves 28–29 with spacers at 30 for offsetting the sleeves the requisite distance for purposes of axial alignment with anchor pin bores B. Additional welds (FIG. 4) join the spacers, sleeves and support into a rigid, unitary mass not susceptible to deflection under stresses imposed during hole sizing operations. The inner or right hand end of the bearing sleeves may be forwardly offset somewhat as shown to provide a projected bearing surface to enhance boring bar support during boring.

In that form of the invention seen in FIGS. 1 through 6 a boring bar indicated at 32 is shown journalled in bearing sleeve 28 while the remaining sleeve 29 (unseen in FIG. 1) carries a retainer bar 33. Boring bar 32 is of cylindrical shape having an outer wall 32A of a uniform diameter providing a working fit within the bearing sleeve wall. The outer end of boring bar 32 is squared at 32B to permit chucking of the bar within the chuck of an electric drill preferably of the one-half inch size. The opposite end of the bar carries a cutter tool indicated at 31. Advancement of the boring bar during boring is, in this form of the invention, by manual pressure exerted on the electric drill by the operator. Other power driven instrumentalities may be used in place of the boring bar with said instrumentalities being considered as equivalents to said bar.

Carried in the identical bearing sleeve 29 is the retainer bar 33 having its enlarged or, as viewed in the drawings, right-hand end 33A exposed in close proximity to a worn anchor pin bore in the spider. The remaining length of the retainer bar is, in similarity to the boring bar, of cylindrical shape with an outer wall diameter also providing a working fit with the internal wall of the sleeve. Oppositely, the enlarged outer end 33A of the retainer bar is of a size to occupy an anchor pin bore in a manner preventing any play therebetween. Both of the bores B will be somewhat enlarged by reason of reaction forces incurred by the distal ends of the anchor pins normally mounted therein. Metal migration will not be uniformly radial but rather will be, to the greatest extent, in opposite directions adjacent opposite ends of the bores. The bore, even though out-of-round will closely receive the enlarged end 33A of the retainer bar with arcuate wall segments of the bore acting to seat the inserted retainer bar end 33A. The remainder of the bar within sleeve 29 securely retains the bearing sleeve and other associated components of the tool against undesired lateral movement.

In use, the boring bar 32 is chucked at its outer end into the chuck of the electric drill (not shown) whereupon it is manually advanced into contact with the spider. The drill will rotate the boring bar via the drills reduction drive with the boring bar cutter 31 ultimately passing through the bore resizing same for the later reception of a bushing (not shown). The bushing when seated within the rebored opening restores the anchor pin bore to original size.

Upon arcuate positioning of the base 22 about the axle the boring bar and retainer bar are withdrawn from their bearing sleeves in a forward direction (toward the axle midpoint) for interchanged placement back into said sleeves. The adjustable axle nut at 34 is backed off slightly to permit such positioning after which it is again retightened to hold the tool in a canted position during interchange of the boring and retainer bars.

Repositioning of the tool to an upright position aligns the retainer bar with the bushing in the rebored opening while the boring bar is now in alignment with the remaining anchor pin bore. After boring of same, a bushing is installed therein thus completing the repair of the brake spider anchor pin bores.

Figure 8:
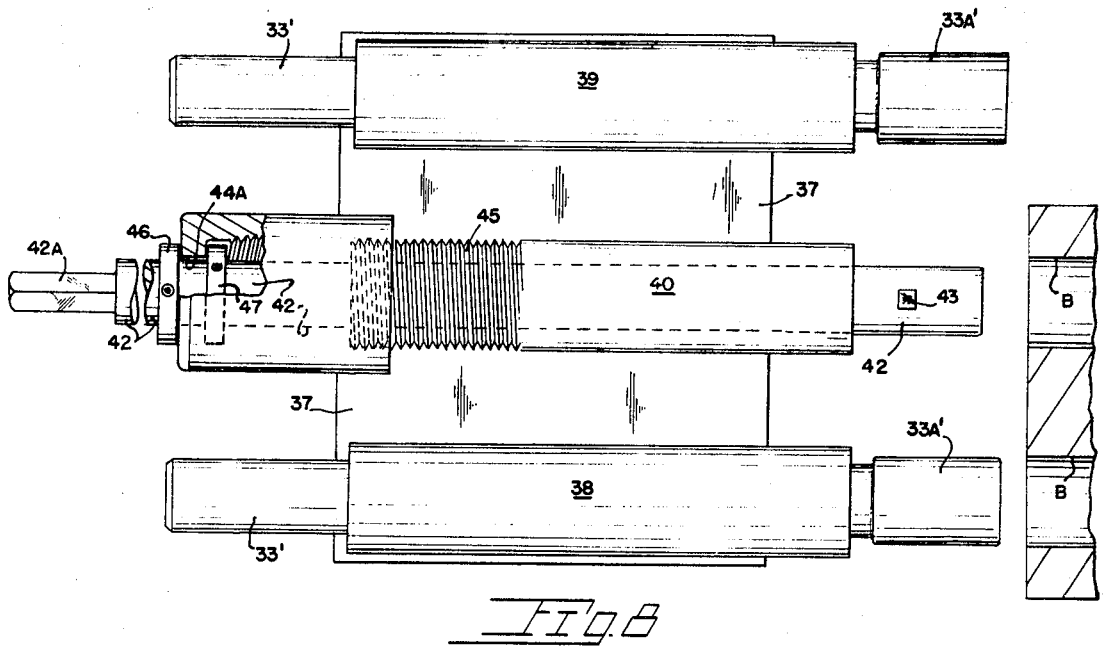
FIG. 8 is a plan view of FIG. 7.

In FIGS. 7 and 8 a modified form of the invention comprises a base 22' also having adapter means such as annular inserts 23'-24' for rotatably mounting the tool base on the end of an axle all being in accordance with the first described form of the invention. The upright support at 36 includes a transversely disposed member 37 for the mounting of a pair of spaced apart bearing sleeves 38 and 39, similar to those earlier described, but within which are permanently housed retainer bars 33' having enlarged inner ends 33A' of the type earlier described.

A centrally disposed bearing sleeve at 40 includes manually actuated feed means including a traveler element at 44 for axially feeding a boring bar at 42. The boring bar 42 carries a cutter element 43 and, in continuing similarity to the boring bar earlier described, terminates rearwardly in a squared end portion 42A.

The manually actuated feed means, in addition to the traveler element 44, includes a threaded segment 45 of center bearing sleeve 40. The traveler element 44 is apertured at 44A to receive boring bar 42 with set screw affixed collars at 46-47 serving to transfer linear motion of the traveler 44 to the boring bar. Accordingly, during rotation of the boring bar chucked in an electric drill, the bar is advanced in a positive manner by manual rotation of traveler element 44 by the operator's free hand. In this form of the invention the boring bar at all times remains journalled in sleeve 40 in distinction to the first described form of the invention.

The retainer bars indicated at 33' are likewise permanently retained within sleeves 38-39 for alternate sliding engagement of their enlarged ends 33A' with different anchor pin bores B during boring of the remaining bore. Arcuate movement of the base 22 about the axle in the general manner earlier described permits sequential retainer bar alignment and seating within an anchor pin bore to hold the tool during boring.

The feature of providing a traveling element on the bearing sleeve may also be applied to the first form of the invention with but minor, obvious alterations and hence comes within the scope of the present invention. Further it will be understood that while I have shown and described a boring bar this term is intended to encompass equivalent metal working instrumentalities e.g., a reamer, grinding wheel, drill bit, etc., which may be used in a similar manner for resizing of the anchor pin bore.

While I have shown but a few embodiments of the invention it will be apparent to those skilled in the art that the invention may be embodied still otherwise without departing from the spirit and scope of the invention.

Having thus described the invention what is desired to be secured under a Letters Patent is:

1. A tool for reboring anchor pin bores in a brake spider while the spider remains in place on the vehicle axle,
   a base of elongate open construction for supported engagement along the outer end segment of the axle, means retaining said base on said axle,
   adapter means interposed between said base and the axle segment mounting the base for rotational movement about the major axis of the axle,
   upright support means carried by said base and extending upwardly therefrom,
   elongate bearing sleeves mounted upon said support means and positionable into spaced axial alignment with the anchor pin bores upon rotational movement of the base,
   a boring bar journalled in one of said sleeves and adapted for operational movement into and out of an anchor pin bore of the spider,
   a retainer bar disposed in another of said sleeves axially positionable into inserted engagement with the other anchor pin bore of the spider to lock the tool against rotational movement during boring of the first mentioned anchor pin opening by the boring bar, and
   rotation of said base about said axle permitting consecutive alignment of the boring bar with each anchor pin bore for the boring thereof.

2. The tool as claimed in claim 1 wherein said adapter means comprises annularly shaped inserts of various inside diameters attachable to said base to permit mounting of the latter on an axle end segment having multiple diameters.

3. The tool as claimed in claim 1 wherein said inserts include those of various lengths for the additional purpose of locating the base along the outer end segment of the axle to achieve desired clearance between the bearing sleeve ends and the brake spider to permit lateral movement of said bars into and out of axial alignment with the anchor pin bores.

4. The tool as claimed in claim 1 additionally including a feed means for the boring bar, said feed means comprising a bearing sleeve threaded for a portion of its length, a traveler element adjustably mounted on said threaded portion and engageable with said boring bar for axially urging same into boring engagement with the anchor pin bore.

5. The tool as claimed in claim 1 wherein a pair of bearing sleeves are oppositely spaced from a centrally disposed bearing sleeve, a retainer bar slidably carried in each of said oppositely spaced bearing sleeves, said boring bar permanently carried within said centrally disposed bearing sleeve, said retainer bars being sequentially engageable upon opposite arcuate positioning of the tool into alignment with an anchor pin bore for tool positioning during successive boring of the anchor pin bores by the boring bar.

6. The tool as claimed in claim 5 additionally including feed means for advancing the boring bar during a boring operation.

7. The tool as claimed in claim 6 wherein said feed means comprises a traveler element in threaded attachment with a bearing sleeve, said traveler element adapted to axially displace the boring bar upon rotation of said element.

8. The tool as claimed in claim 6 wherein said adapter means comprises annularly shaped inserts of various inside diameters attachable to said base to permit mounting of the latter on an axle end segment having multiple diameters.

9. The tool as claimed in claim 7 wherein said inserts additionally include those of various lengths for the purpose of locating the base along the outer end segment of the axle to achieve desired clearance between the bearing sleeve ends and the brake spider to permit lateral movement of said bars into and out of axial alignment with the anchor pin bores.

* * * * *